US010248891B2

(12) United States Patent
Gopalan

(10) Patent No.: US 10,248,891 B2
(45) Date of Patent: Apr. 2, 2019

(54) IMAGE PREDICTION

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 64 days.

(21) Appl. No.: 15/627,498

(22) Filed: Jun. 20, 2017

(65) Prior Publication Data

US 2018/0365531 A1 Dec. 20, 2018

(51) Int. Cl.
G06K 9/00 (2006.01)
G06K 9/62 (2006.01)
G06K 9/48 (2006.01)

(52) U.S. Cl.
CPC ........... G06K 9/6277 (2013.01); G06K 9/481 (2013.01); G06K 9/6232 (2013.01); G06K 9/6256 (2013.01); G06K 9/6276 (2013.01); G06K 9/6298 (2013.01)

(58) Field of Classification Search
CPC .. G06K 9/6277; G06K 9/6256; G06K 9/6232; G06K 9/6276; G06K 9/6298; G06K 9/481
USPC ............... 382/100, 159, 103, 162, 167, 277; 706/15, 16, 21, 25, 45, 14, 12, 46, 50, 52
See application file for complete search history.

(56) References Cited

U.S. PATENT DOCUMENTS

| 8,428,315 | B2* | 4/2013 | Suetens ................... G06T 19/20 382/128 |
|---|---|---|---|
| 8,457,422 | B2 | 6/2013 | Nakagami et al. |
| 8,812,494 | B2 | 8/2014 | Priyadershan et al. |
| 9,538,116 | B2 | 1/2017 | Begeja et al. |
| 9,552,070 | B2* | 1/2017 | Shotton ................... G06F 3/017 |
| 9,595,083 | B1 | 3/2017 | Smith et al. |
| 2005/0267726 | A1 | 12/2005 | Kim et al. |
| 2011/0229049 | A1 | 9/2011 | Kondo |

(Continued)

OTHER PUBLICATIONS

Abhishek Kar "Future Image Prediction using Artificial neural networks", (Year: 2017).*

(Continued)

*Primary Examiner* — Sheela C Chawan
(74) *Attorney, Agent, or Firm* — Hartman & Citrin LLC

(57) ABSTRACT

Concepts and technologies disclosed herein are directed to image prediction. According to one aspect disclosed herein, an image prediction system can receive a training data set that includes a plurality of training images. The image prediction system can define N-dimensional feature vectors corresponding to the plurality of training images in the training data set, parameterize the N-dimensional feature vectors to obtain a plurality of parameterized curves corresponding the plurality of training images in the training data set, obtain a square root velocity representation for each parameterized curve of the plurality of parameterized curves, rescale the plurality of parameterized curves to remove scaling variability among the plurality of parameterized curves, define a pre-shape space for the plurality of parameterized curves, and obtain shape space points pertaining to each parameterized curve of the plurality of parameterized curves on a shape space that inherits a structure from the pre-shape space.

20 Claims, 9 Drawing Sheets

(56) References Cited

U.S. PATENT DOCUMENTS

2016/0080446 A1   3/2016  Karthikeyan et al.
2016/0203386 A1   7/2016  Porecki et al.
2016/0353144 A1  12/2016  Gopalan

OTHER PUBLICATIONS

Kar, Abhishek, "Future Image Prediction using Artificial Neural Networks," retrieved at https://people.eecs.berkeley.edu/~akar/IITK_website/EE671/report_images.pdf on May 12, 2017.
Furness, Dyllan, "MIT Algorithm Can Predict the (Immediate) Future From Still Images," Digital Trends, Nov. 28, 2016, https://www.digitaltrends.com/computing/mit-future-video/.

* cited by examiner

IMAGE PREDICTION

BACKGROUND

Events in life are temporal in nature and hence given a single image or a stream of images it is natural for one to ask what images are likely to follow in the future. Such a question falls in the realm of predictive analytics, wherein, given data evolution models derived from training datasets, one is interested in estimating how data would evolve at future time instances. While there has been a considerable amount of work in this area for stock pricing and natural language processing applications, image prediction has been receiving attention only recently, and it has many interesting applications.

SUMMARY

Concepts and technologies disclosed herein are directed to image prediction. According to one aspect of the concepts and technologies disclosed herein, an image prediction system can receive a training data set that includes a plurality of training images. The image prediction system can define N-dimensional feature vectors corresponding to the plurality of training images in the training data set, parameterize the N-dimensional feature vectors to obtain a plurality of parameterized curves corresponding to the plurality of training images in the training data set, obtain a square root velocity representation for each parameterized curve of the plurality of parameterized curves, rescale the plurality of parameterized curves to remove scaling variability among the plurality of parameterized curves, define a pre-shape space for the plurality of parameterized curves, and obtain shape space points pertaining to each parameterized curve of the plurality of parameterized curves on a shape space that inherits a structure from the pre-shape space.

In some embodiments, the image prediction system can collect a set of test images within a time range. The image prediction system can parameterize the set of test images to obtain a test parameterized curve. The image prediction system can obtain a new square root velocity representation point for the test parameterized curve on the shape space.

In some embodiments, the image prediction system can determine a mean of a plurality of training points on the shape space. Each of the plurality of training points corresponds to the square root velocity representation for each corresponding parameterized curve of the plurality of parameterized curves. The image prediction system can then define a tangent space around the mean and can warp the plurality of training points from the shape space onto the tangent space using inverse exponential mapping. The term "warp" is used herein to encompass mapping, transforming, and/or projecting points from one space to another. The "space" can include the shape space and the tangent space. The "points" generally refer to the data being warped. The image prediction system can perform multi-variate statistical analysis on the tangent space to determine a most representative subset of the plurality of training points for a given test point and can predict a test image.

In some embodiments, the image prediction system can select a topic for prediction and consider a plurality of training points pertaining to the topic selected for prediction. The image prediction system can determine a mean of the plurality of training points on the shape space. Each of the plurality of training points corresponds to the square root velocity representation for each corresponding parameterized curve of the plurality of parameterized curves belonging to the topic selected for prediction. The image prediction system can warp the plurality of training points from the shape space onto a tangent space defined at the mean. The image prediction system can perform a principal component analysis on the tangent space to yield a principal component analysis matrix, perform dimensionality reduction by retaining eigenvectors with eigenvalues greater than 0.1, warp a test point onto the tangent space corresponding to the topic selected for prediction, and perform dimensionality reduction using the principal component analysis matrix learnt on the tangent space. The image prediction system can then consider a nearest training neighbor based upon a distance of the eigenvectors and predict a test image based upon a test parameterized curve corresponding to the nearest training neighbor.

In some embodiments, the image prediction system can determine a mean of the plurality of training points on the shape space. Each of the plurality of training points corresponds to the square root velocity representation for each corresponding parameterized curve of the plurality of parameterized curves. The image prediction system can warp the plurality of training points from the shape space onto a tangent space defined at the mean. The image prediction system can perform a principal component analysis on the tangent space and warp a test point onto the tangent space. The image prediction system can consider a nearest training neighbor and predict a test image based upon a test parameterized curve corresponding to the nearest training neighbor.

In some embodiments, the image prediction system can determine a mean of the plurality of training points on the shape space. The image prediction system can warp the plurality of training points from the shape space onto a tangent space defined at the mean. The image prediction system can perform dimensionality reduction using linear discriminant analysis to obtain reduced dimensional vectors. The image prediction system can consider a nearest training neighbor based upon a distance of the reduced dimensional vectors. The image prediction system can assign a topic label of the nearest training neighbor to a test point.

In some embodiments, the image prediction system can collect a test image within a time range. The image prediction system can parameterize the test image to obtain a test parameterized curve. The image prediction system can obtain a new square root velocity representation point for the test parameterized curve on the shape space.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
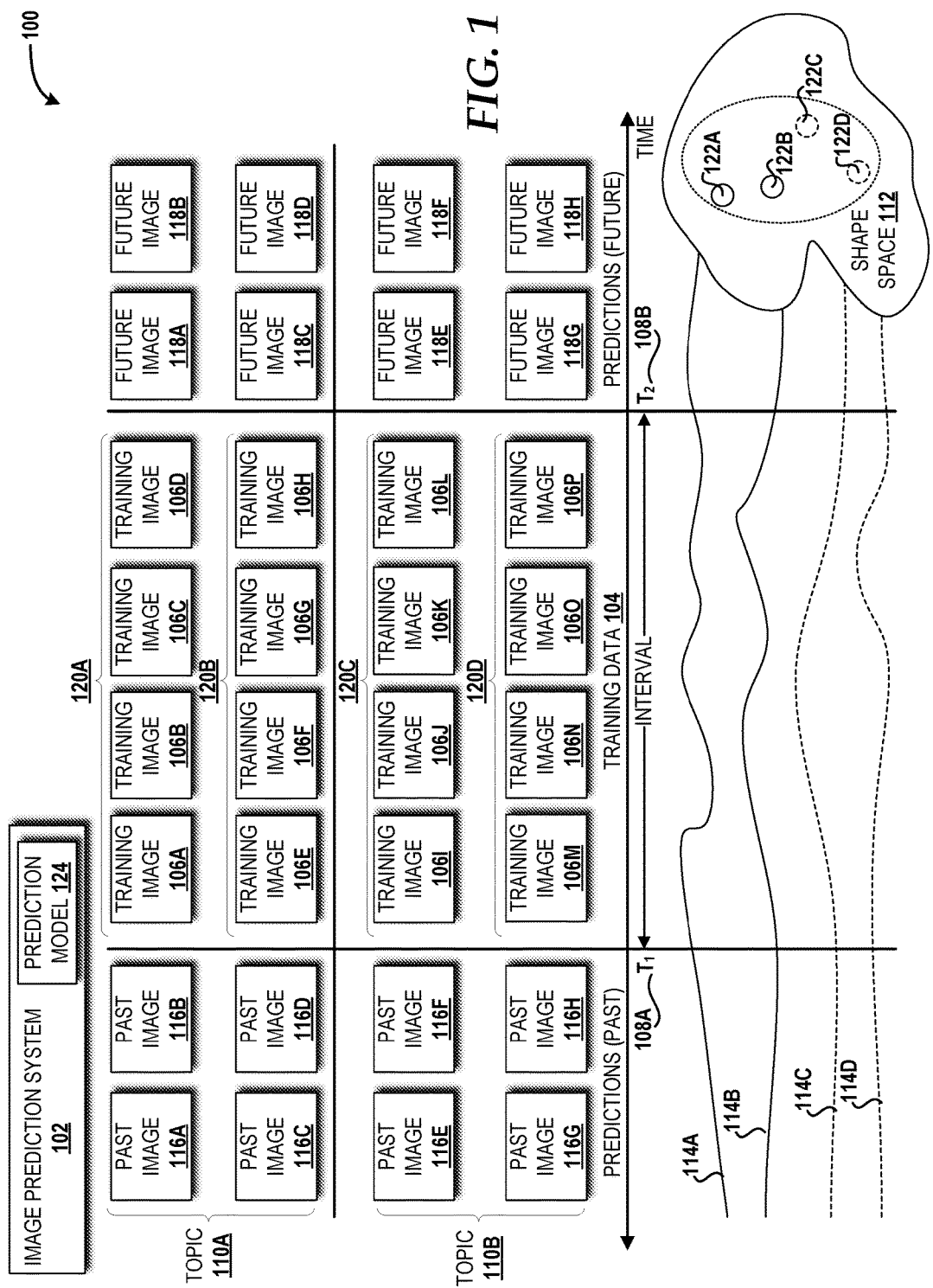
FIG. 1 is a block diagram illustrating an overview of an approach for image prediction, according to an illustrative embodiment of the concepts and technologies disclosed herein.

There are several studies in computer vision that have focused on capturing the general notion of image dynamics. Popular among them are tracking and activity analysis, where the primary focus is on modeling temporal evolution of objects and relevant interest regions within a video sequence and, more recently, on estimating/predicting how the entire visual scene would transform at subsequent time instances immediately before or after what is contained in the video. The main assumption in this analysis is that the images across the video sequence have a strong notion of smoothness or continuity, which is not satisfied by image prediction where images that would appear in the future might not have any common characteristics with the images currently available. There also have been other efforts on using temporal information contained in image sequences to supplement other visual tasks; for example, timestamp visual metadata has been used for annotation in personal photo collections, geo-location estimation of a photo sequence, object and event search in online image communities as well as in scene completion. A non-parametric approach based on the sequential Monte Carlo to explicitly model temporal evolution of topics in web image collections also has been explored. While image prediction was not the main focus of this work, a related problem of sub-topic outbreak detection where the modeled temporal evolution is used to predict variability within a topic was explored. Also highlighted in this work was the utility of modeling image evolution in complementing text-based analysis of topics and for image classification.

Another line of research ties the notion of prediction to that of time-sensitive image retrieval. While traditional image retrieval techniques have focused mainly on semantic similarity and feature correspondence, this research presented a parametric approach based on multi-variate point processes to account for temporal similarity among images. More specifically, given a stream of training images until a time instant T and a future query time, the goal of this research was to cluster temporal trends amongst the training images and to suggest possible images for the future query time that would be similar to the actual images that occurred at that time. This research also addressed prediction from the standpoint of personalizing prediction to a user's data. Other recent studies performed time-sensitive web image ranking and retrieval using dynamic multi-task regression, predicting evolution of image annotations from social media to assist image retrieval, and even estimating the age of historical photographs. A common thread among these approaches is to utilize temporal information as a timestamp entity to accompany image semantic models, rather than explicitly modeling the properties of temporal evolution in those image streams.

Predicting the temporal evolution of images is an interesting problem that has applications in surveillance, content recommendation, and behavioral analysis, among others. Given a single image or a stream of images with timestamps, a goal of the concepts and technologies disclosed herein is to predict possible images that could appear at different time instances in the future. The concepts and technologies disclosed herein can utilize a data-driven Riemannian shape theoretic approach to address this problem. This approach analyzes the space of temporal evolution patterns in training image streams and performs statistical analysis on this shape space to facilitate future image prediction. The concepts and technologies disclosed herein consider both discriminative and generative statistical analysis techniques on the shape space to accommodate cases where the training and test data might or might not have an associated class/topic label. The concepts and technologies disclosed herein also provide complimentary results on predicting images in the past—specifically, for time instances before the training data was acquired—and empirically analyze how the prediction accuracy varies over time.

The concepts and technologies disclosed herein for image prediction are based, at least in part, upon spatio-temporal predictive mechanisms for signals satisfying certain global restraints. For example, in image sequences with smoothly changing pixel or region values, several non-linear, non-causal, dynamic systems with both parametric and non-parametric characteristics have been pursued to estimate new pixel values that are optimal in the mean-squared error sense. However, the primary challenge posed by the image prediction problem is that the images that would appear in future time instances might have absolutely no resemblance with respect to the images currently available and thus a pixel or a region-level temporal modeling might not be sufficient. Furthermore, the training data to be modeled for the temporal evolution of images need not be aligned because each training data stream might pertain to different timescales with varying start and end time instances.

The concepts and technologies disclosed herein use a data-driven shape theoretic approach in the Riemannian space such that the complex non-linearities inherent to temporal evolution of images can be better captured than the existing Euclidean counterparts. More specifically, by starting with parametric curves fitted to features of the training image sequence, the concepts and technologies disclosed herein work on a shape space induced by the square root velocity ("SRV") representation of the curves to model the temporal evolution of the training image sequence features while being robust to alignment issues. The concepts and technologies disclosed herein then carry out statistical computations on the shape space in both a generative and a discriminative methodology such that, unlike other existing approaches, the concepts and technologies provide the flexibility to perform prediction when training and test data have topic labels, when training and test data do not have topic labels, when the test data contains only a single image or a stream of images, and when the images only have a topic label.

The concepts and technologies disclosed herein are platform independent, and as such, can be used in many context, some examples of which include, but are not limited to, image search engines, image retrieval, image recommendations, and the like. For example, given a collection of visual content (e.g., images) consumed by one or more users, the concepts and technologies disclosed herein can suggest what visual content will be interesting to the user(s) at different time instances in the future. This also can be useful for suggesting relevant ad content, interesting places to visit, movies, sporting events, or TV shows that might be of interest to the user(s). The concepts and technologies disclosed herein can be applied to surveillance as well. For example, based upon a sequence of surveillance images, the concepts and technologies can alert surveillance agencies, emergency services, and/or the like of any untoward event that is likely to occur in the future, so that the event can be prevented rather than these entities being reactive to the event after it has occurred.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of image prediction will be described.

Referring now to FIG. 1, a block diagram illustrating an overview 100 of an approach for image prediction will be described, according to an illustrative embodiment of the concepts and technologies disclosed herein. It should be understood that the overview 100 and the various components thereof have been greatly simplified for purposes of discussion. Accordingly, additional or alternative components of the overview 100 can be made available without departing from the embodiments of the concepts and technologies described herein.

The illustrated overview 100 includes an image prediction system 102 that utilizes training data 104, including a plurality of training images 106A-106P ("training images 106"), within a given time interval between a time $T_1$ 108A and a time $T_2$ 108B and corresponding to topics of interest 110A-110B ("topics or topic labels 110") to model a temporal evolution of the training images 106 using a shape space 112 induced by the square root velocity ("SRV") representation of parametric curves 114A-114D to enable prediction of one or more past images 116A-116H ("past images 116") and/or a plurality of future images 118A-118H ("future images 118"). The training images 106 are divided into four training image streams, shown here row-wise, with the first two rows 120A, 120B belonging to a first topic 110A, and the last two rows 120C, 120D belonging to a second topic 110B. The training image streams are shown having the same time interval between the time $T_1$ 108A and the time $T_2$ 108B. In some embodiments, the training image streams can have different start and/or end time instances and/or a different sampling frequency. The shape space 112 includes shape space points 122A-122D corresponding to the training image streams in the rows 120A-120D, respectively. Given test data (not shown)—for example, a single test image, a set (or sequence) of images, or just a topic label—in the time interval between the time $T_1$ 108A and the time $T_2$ 108B, the image prediction system 102 can predict one or more images outside of the time interval (i.e., the past image(s) 116 and/or the future image(s) 118) using a learned prediction model 124 created based upon the training data 104.

The concepts and technologies disclosed here provide a data-driven shape theoretic approach in the Riemannian space such that the complex non-linearities inherent to temporal evolution of images can be better captured than the existing Euclidean counterparts. More specifically, by starting with the parametric curves 114A-114D fitted to common features of the training images 106, the image prediction system 102 utilizes the shape space 112 induced by the SRV representation of the parametric curves 114A-114D to model the temporal evolution of the parametric curves 114A-114D while being robust to alignment issues. The image prediction system 102 disclosed herein then carries out statistical computations on the shape space 112 in both a generative and discriminative sense such that, unlike other existing approaches, the image prediction system 102 provides the flexibility to perform prediction when training and test data have labels or not, and when the test data contains only a single image or a stream of images, or just a topic label 110.

It should be understood that some implementations of the overview 100 can include a different number of image prediction systems 102, training data 104, training images 106, times 108, topics 110, shape spaces 112, past images 116, future images 118, rows 120 (represented by image streams), parametric curves 114, shape space points 122, prediction models 124, or any combination thereof. Thus, the illustrated embodiment should be understood as being illustrative, and should not be construed as being limiting in any way.

Figure 2:
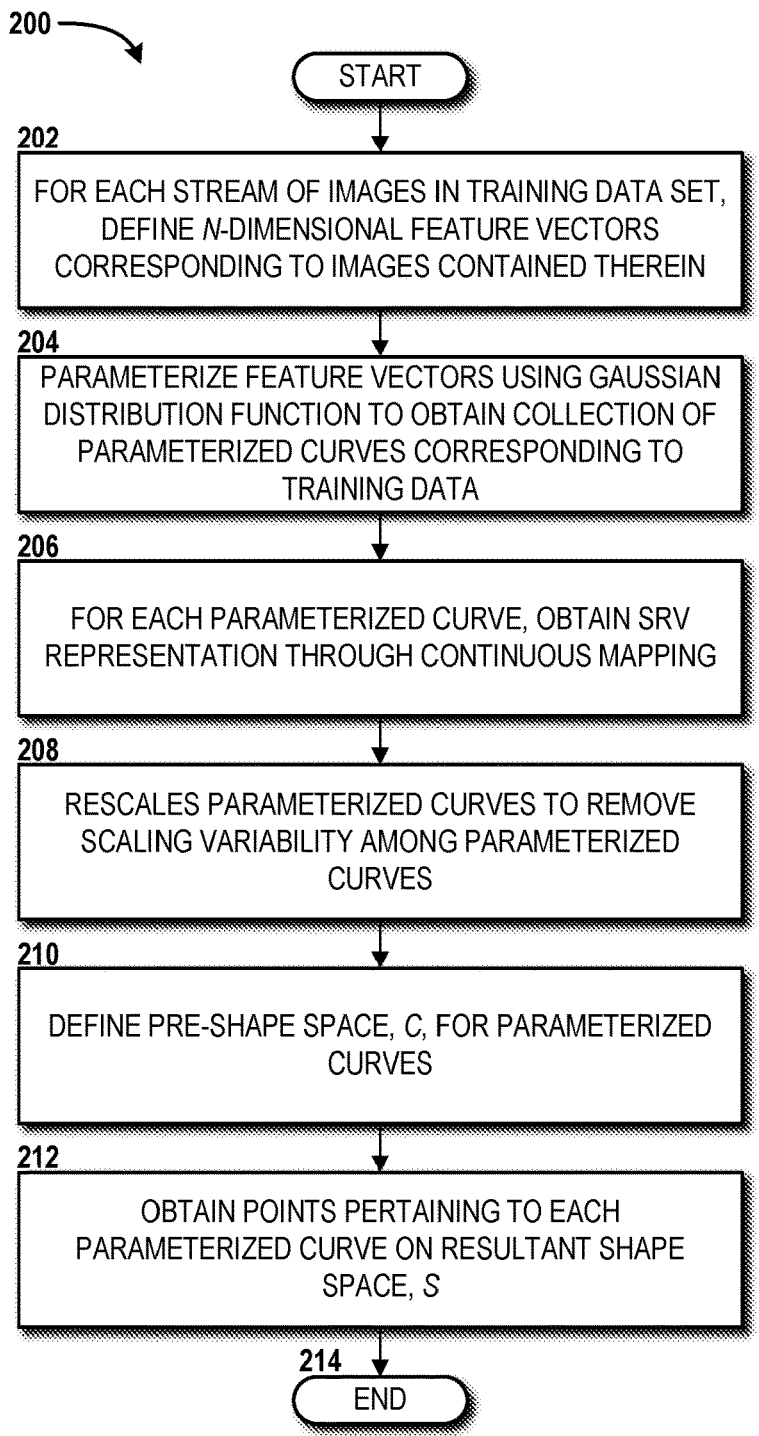
FIG. 2 is a flow diagram illustrating aspects of a method for modeling temporal evolution of images, according to an illustrative embodiment of the concepts and technologies disclosed herein.

Turning now to FIG. 2, a flow diagram illustrating aspects of a method 200 for modeling temporal evolution of images, such as the training images 106, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of one or more computing systems and/or devices disclosed herein, such as the image prediction system 102, to perform operations.

For purposes of illustrating and describing some of the concepts of the present disclosure, operations of the methods disclosed herein are described as being performed, at least in part, by the image prediction system 102, via execution, by one or more processors, of one or more software modules, which can be used to implement the prediction model 124. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The methods disclosed herein will be described in context of the following: Let $\{x_i\}_i$ denote the training data 104, where each $x_i$ consists of a stream (e.g., a set or a sequence) of images, such as the training images 106, taken within a time interval, such as between $T_1$ 108A and $T_2$ 108B. Each $x_i$ also can have an associated topic label $y_i$, such as the topic label 110, pertaining to one of M different topics that the training images 106 contained therein correspond thereto. As a non-limiting example, $x_i$ can be a set of images retrieved from a news website within the time interval between $T_1$ 108A and $T_2$ 108B when searched for a particular topic keyword such as "football." Test data $\{\bar{x}_i\}_i$ corresponding to all M topics, such as the topics 110, also is provided. Each $\bar{x}_i$ contains a set of images pertaining to (i) timestamps between $T_1$ 108A and $T_2$ 108B, denoted by $\bar{x}_i^a$, and (ii) timestamps before $T_1$ 108A and $T_2$ 108B, denoted by $\bar{x}_i^b$.

Given this context, a goal of the concepts and technologies disclosed herein is to model temporal evolution of the training data $\{x_i\}_i$ 104, such that, given a test image set $\bar{x}_i^a$, the images predicted using the prediction model 124 for a timeframe before $T_1$ 108A and $T_2$ 108B, say $\bar{x}^*_i$, are similar to the actual test images present in that timeframe, namely $\bar{x}_i^b$. The concepts and technologies disclosed herein also address scenarios where $\bar{x}_i^a$ contains only a single test image and when only the topic label of the images is available to be predicted without any image(s) for $\bar{x}_i^a$. This goal is met using a two-stage approach by (i) modeling temporal evolution within the training data using principles from Riemannian shape analysis and (ii) utilizing statistical tools on the shape space 112 to predict future images 118 and past images 116, in both a generative and discriminative manner depending on the availability of topic labels for training and test data. Towards this end, the method 200 is described under the assumption that the images are represented by an N-dimensional feature vector, the choice of which choice depends on a sample dataset.

The method 200 will be described with reference to FIG. 2 and further reference to FIG. 1. The method 200 begins and proceeds to operation 202, where, for each stream of images in a training data set (e.g., the training data 104), the image prediction system 102 can define N-dimensional feature vectors corresponding to the images (e.g., the training images 106) contained therein. From operation 202, the method 200 proceeds to operation 204, where the image prediction system 102 parameterizes the feature vectors using a Gaussian distribution function $g_i$ to obtain a collection of parameterized curves $\{g_i\}_i$ (e.g., the parameterized curves 114) corresponding to the training data 104 $\{x_i\}_i$. It should be understood that the image prediction system 102 can parameterize the feature vectors using other functions. Accordingly, the use of a Gaussian distribution function is one illustrative embodiment and should not be construed as being limiting in any way. After obtaining a collection of parameterized curves 114 $\{g_i\}_i$ corresponding to the training data 104 $\{x_i\}$, the image prediction system 102 can model the temporal trends contained therein to create the prediction model 124 to enable prediction. However, the information contained within the collection of parameterized curves 114 $\{g_i\}_i$ do not need to be aligned. This is because the images (e.g., the training images 106) across the training data 104 $\{x_i\}_i$, although belonging to time instances between $T_1$ 108A and $T_2$ 108B, might not correspond to the same start time and/or end time. Moreover, the sampling interval between the images also can be different. One way to accommodate for this is to normalize the parameterized curves 114 $\{g_i\}_i$.

From operation 204, the method 200 proceeds to operation 206, where, for each parameterized curve 114 in the collection of parameterized curves 114 $\{g_i\}_i$, the image prediction system 102 obtains its SRV representation $G_i$. Given a parameterized curve $g_i$ ($g_i:D\rightarrow\mathbb{R}^n$) where D is a certain domain for parameterization, the SRV representation $G_i$ is obtained through continuous mapping $$G_i(t) = \frac{g_i(t)}{\sqrt{\|g_i(t)\|}}$$

where $\|.\|$ is the Euclidean 2-norm in $\mathbb{R}^n$. From operation 206, the method 200 proceeds to operation 208, where the image prediction system 102 rescales the parameterized curves 114 to remove scaling variability among the parameterized curves 114 such that all of the parameterized curves 114 are of length $2\pi$. Thus, the SRV functions associated with the parameterized curves 114 are elements of a hypersphere in the Hilbert manifold $\mathbb{L}^2$ (D, $\mathbb{R}^n$). From operation 208, the method 200 proceeds to operation 210, where the image prediction system 102 defines a pre-shape space, C, for each of the parameterized curves 114. From operation 210, the method 200 proceeds to operation 212, where the image prediction system 102 can then account for other normalizing transformations, such as translation, rotation, and re-parameterization, to obtain points (e.g., the shape space points 122) pertaining to SRV representations $G_i$'s on the resultant shape space S (e.g., the shape space 112) that inherits the Riemannian structure from C. From operation 212, the method 200 proceeds to operation 214. The method 200 ends at operation 214.

Figure 3:
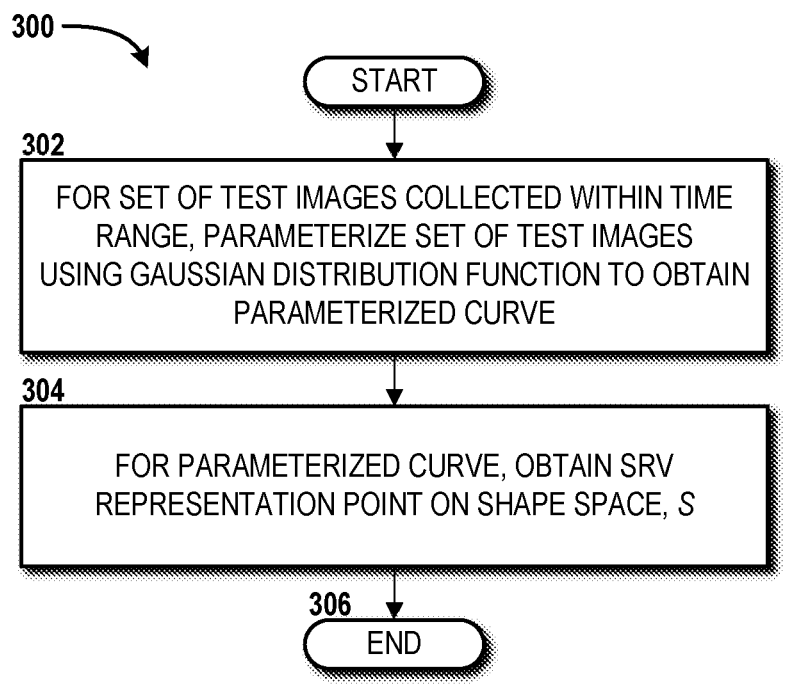
FIG. 3 is a flow diagram illustrating aspects of a method for obtaining square root velocity ("SRV") representation points for a set of test images, according to an illustrative embodiment of the concepts and technologies disclosed herein.

Turning now to FIG. 3, a flow diagram illustrating aspects of a method 300 for obtaining SRV representation points for a set of test images will be described, according to an illustrative embodiment of the concepts and technologies disclosed herein. The method 300 begins and proceeds to operation 302, wherein, given a set of test images $\bar{x}_i^a$ collected within a time range (e.g., between $T_1$ 108A and $T_2$ 108B), the image prediction system 102 can parameterize the set of test images $\bar{x}_i^a$ with a Gaussian function $\bar{g}_i$ to obtain parameterized curves. From operation 302, the method 300 proceeds to operation 304, where, for each parameterized curve, the image prediction system 102 obtains an SRV representation point $\bar{G}_i$ on the shape space 112 S. Such a representation enables systematic analysis for modeling points on the shape space 112 S using tools that account for the geometry of the shape space 112 S. From operation 304, the method 300 proceeds to operation 306.

Figure 4:
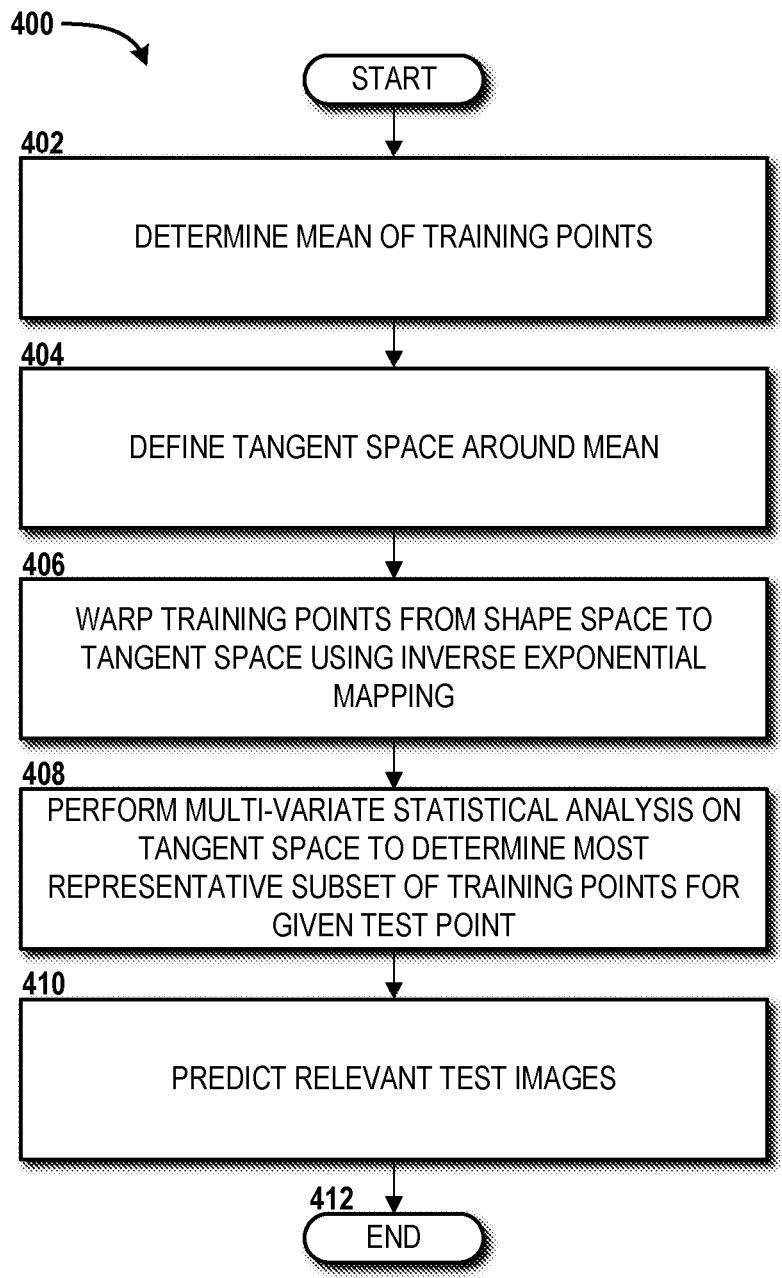
FIG. 4 is a flow diagram illustrating aspects of a method for statistical modeling for image prediction, according to an illustrative embodiment of the concepts and technologies disclosed herein.

Turning now to FIG. 4, a flow diagram illustrating aspects of a method 400 for statistical modeling for image prediction will be described, according to an illustrative embodiment of the concepts and technologies disclosed herein. The method 400 describes statistical modeling on the shape space 112 S to transfer temporal evolution patterns conveyed by the training points $\{G_i\}_i$ onto the test point $\bar{G}_i$ and to predict relevant test images $\bar{x}^*_i$ occurring before $T_1$ 108A and after $T_2$ 108B that should ideally be similar to the ground truth contained in $\bar{x}_i^b$.

The method 400 begins and proceeds to operation 402, where the image prediction system 102 determines the mean of the training points. In some embodiments, the image prediction system 102 can determine the mean of the training points on the shape space 112 S using the Karcher mean, which requires a computing distance between points on the shape space 112 S. The shortest distance between a pair of points is given by the geodesic distance. From operation 402, the method 400 proceeds to operation 404, where the image prediction system 102 defines a tangent space T around the mean computed at operation 402. From operation 404, the method 400 proceeds to operation 406, where the image prediction system 102 warps the training points $\{G_i\}_i$ from the shape space 112 S to the tangent space T using inverse exponential mapping. From operation 406, the method 400 proceeds to operation 408, where the image prediction system 102 performs multi-variate statistical analysis on the tangent space T to determine the most representative subset of the training points $\{G_i\}_i$ for a given test point $\bar{G}_i$. From operation 408, the method 400 proceeds to operation 410, where the image prediction system 102 uses the subset to predict relevant test images $\bar{x}^*_i$. From operation 410, the method 400 proceeds to operation 412. The method 400 ends at operation 412.

To compute the geodesic distance, the image prediction system 102 considers the pre-shape space C where, given two points $G_0$ and $G_1$ and a parameterized path $\propto: [0, 1] \to C$ such that $\propto(0) = G_0$ and $\propto(1) = G_1$, the length of $\propto$ is defined as $L[\propto] = \int_0^1 \langle \dot{\propto}(t), \dot{\propto}(t) \rangle^{1/2} dt$. $\propto$ is a length-minimizing geodesic if $L[\propto]$ achieves the infimum over all paths, and the length of this geodesic becomes a distance $$d_c(G_0, G_1) = \propto: \underset{[0,1] \to C \mid \propto(0) = G_0, \propto(1) = G_1^{L[\propto]}}{\inf}.$$

Consequently, the geodesics in C that are perpendicular to all the orbits meet in the pre-shape C, and the geodesic distance between any two points in the shape space 112 S is given by $$d_s([G_0], [G_1]) = \underset{\bar{G}_1 \in [G_1]}{\min} d_c(G_0, \bar{G}_1) = \underset{(\gamma, O) \in \Gamma \times SO(n)}{\inf} d_c(G_0, O(G_1 \cdot \gamma)\sqrt{\dot{\gamma}}).$$

The orbit of $G_0 \in C$ is given by, $[G_0] = \{O(G_0 \circ \gamma)\sqrt{\dot{\gamma}} | (\gamma, O) \in \Gamma \times SO(n)\}$ where rotation of the curve $g_0$ pertaining to $G_0$ is handled by the actions of the special orthogonal group of n×n matrices SO(n), and its re-parameterization by the composition $G_0 \circ \gamma$, $\gamma \in \Gamma$, which is the set of all orientation preserving diffeomorphisms of D. The Karcher mean μ is then given by $$\mu = \underset{[G] \in S}{\arg\min} \sum_i d_S([G], [G_i])^2.$$

Once μ is determined, the image prediction system 102 can map the SRV representations $G_i$'s to the tangent space T using the mapping $v_i = \exp_\mu^{-1}([G_i] \in T_\mu(S))$, where $\exp_\mu^{-1}$ is the inverse exponential map defined at μ.

Figure 5:
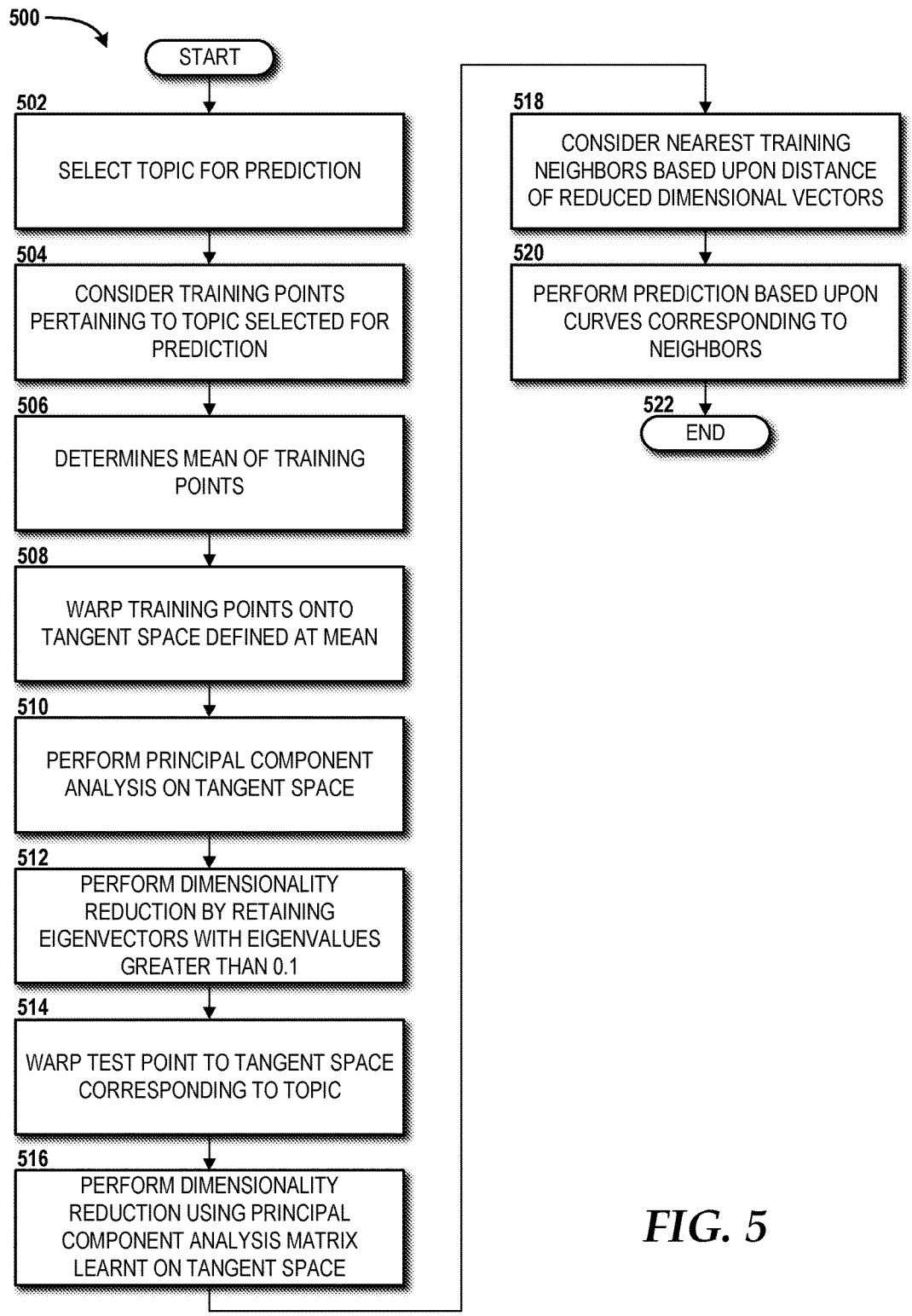
FIG. 5 is a flow diagram illustrating aspects of a method for predicting images based upon labeled training and test points, according to an illustrative embodiment of the concepts and technologies disclosed herein.

Additional methods for predicting images based upon the concepts and technologies described above will now be described based upon whether the training points $\{G_i\}_i$ and the test point $\bar{G}_i$ have topic labels 110 or not. Turning first to FIG. 5, a flow diagram illustrating aspects of a method 500 for predicting images based upon labeled training points and test points will be described, according to an illustrative embodiment of the concepts and technologies disclosed herein. The method 500 begins and proceeds to operation 502, where the image prediction system 102 selects a topic 110 for prediction. The image prediction system 102 can perform the operations of the method 500 for each of the M topics in a given data set. From operation 502, the method 500 proceeds to operation 504, where the image prediction system 102 considers training points pertaining to the topic 110 selected for prediction. From operation 504, the method 500 proceeds to operation 506, where the image prediction system 102 determines the mean of the training points pertaining to the topic selected for prediction. In some embodiments, the image prediction system 102 can compute the mean as a Karcher mean.

From operation 506, the method 500 proceeds to operation 508, where the image prediction system 102 warps the training points onto the tangent space defined at the mean. From operation 508, the method 500 proceeds to operation 510, where the image prediction system 102 performs principal component analysis ("PCA") on the tangent space. This captures holistic trends of temporal evolution pertaining to that topic. From operation 510, the method 500 proceeds to operation 512, where the image prediction system 102 performs dimensionality reduction by retaining those eigenvectors with eigenvalues greater than 0.1.

From operation 512, the method 500 proceeds to operation 514, where, for a given test point, the image prediction system 102 warps the test point to the tangent space T corresponding to its topic 110. From operation 514, the method 500 proceeds to operation 516, where the image prediction system 102 performs dimensionality reduction using the PCA matrix learnt on that tangent space T.

From operation 516, the method 500 proceeds to operation 518, where the image prediction system 102 considers the nearest k training neighbors, based upon the $\ell_2$ distance of the reduced dimensional vectors. From operation 518, the method 500 proceeds to operation 520, where the image prediction system 102 performs prediction based upon the parametric curves $g_i$'s corresponding to those neighbors. More specifically, the image prediction system 102 can sample temporally along each of the curves $g_i$'s outside of the time interval between $T_1$ 108A and T2 108B to obtain a set of N-dimensional feature vectors that forms a prediction output $\bar{x}^*_i$. The prediction output can then be compared with the feature vectors contained in the ground truth $\bar{x}_i^b$ to obtain a prediction accuracy. From operation 520, the method 500 proceeds to operation 522, where the method 500 ends.

Figure 6:
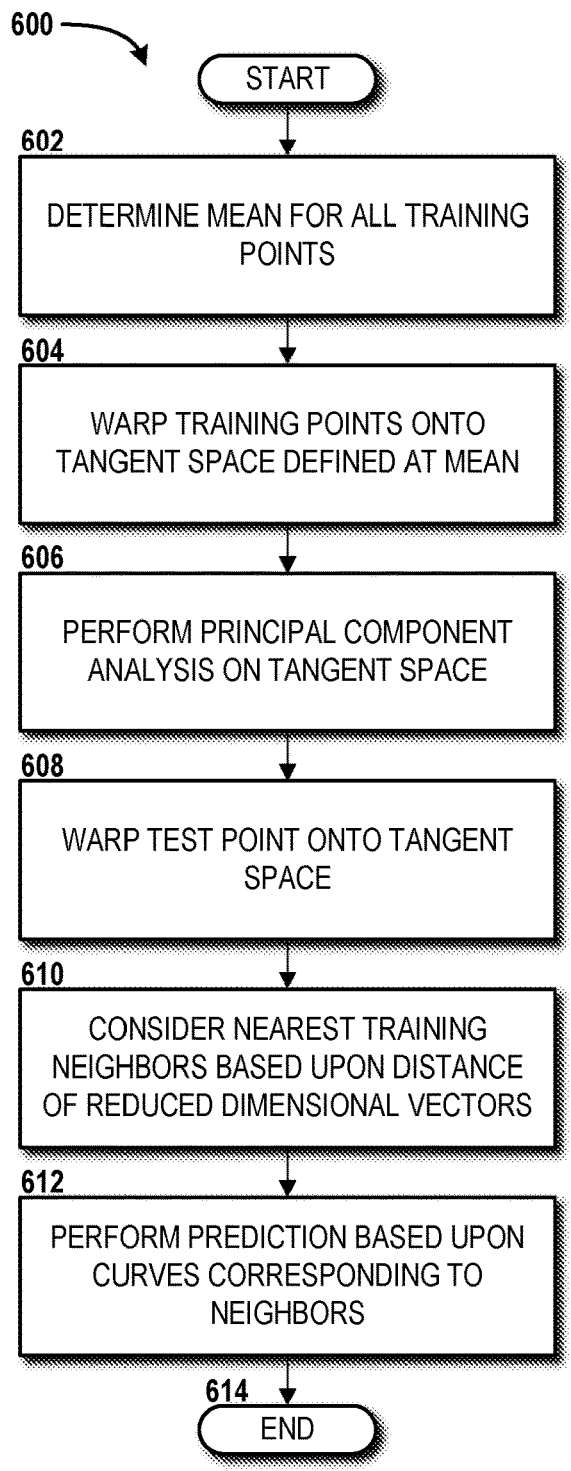
FIG. 6 is a flow diagram illustrating aspects of a method for predicting images based upon unlabeled training and test points, according to an illustrative embodiment of the concepts and technologies disclosed herein.

Turning now to FIG. 6, a flow diagram illustrating aspects of a method 600 for predicting images based upon unlabeled training and test points will be described, according to an illustrative embodiment of the concepts and technologies disclosed herein. The method 600 begins and proceeds to operation 602, where the image prediction system 102 determines the mean for all training points. In some embodiments, the image prediction system 102 can compute the mean as a Karcher mean.

From operation 602, the method 600 proceeds to operation 604, where the image prediction system 102 warps the training points onto the tangent space T defined at the mean. From operation 604, the method 600 proceeds to operation 606, where the image prediction system 102 performs PCA on the tangent space T. From operation 606, the method 600 proceeds to operation 608, where the image prediction system 102 warps the test point to the tangent space T From operation 608, the method 600 proceeds to operation 610, where the image prediction system 102 considers the nearest k training neighbors based upon the $\ell_2$ distance of the reduced dimensional vectors. From operation 610, the method 600 proceeds to operation 612, where the image prediction system 102 performs prediction based upon parametric curves $g_i$'s corresponding to those neighbors. More specifically, the image prediction system 102 can sample temporally along each of the parametric curves $g_i$'s outside of the time interval between $T_1$ 108A and $T_2$ 108B to obtain a set of N-dimensional feature vectors that forms a prediction output $\bar{x}^*_i$. The prediction output can then be compared with the feature vectors contained in the ground truth $\bar{x}_i^b$ to obtain a prediction accuracy. From operation 612, the method 600 proceeds to operation 614, where the method 600 ends.

Figure 7:
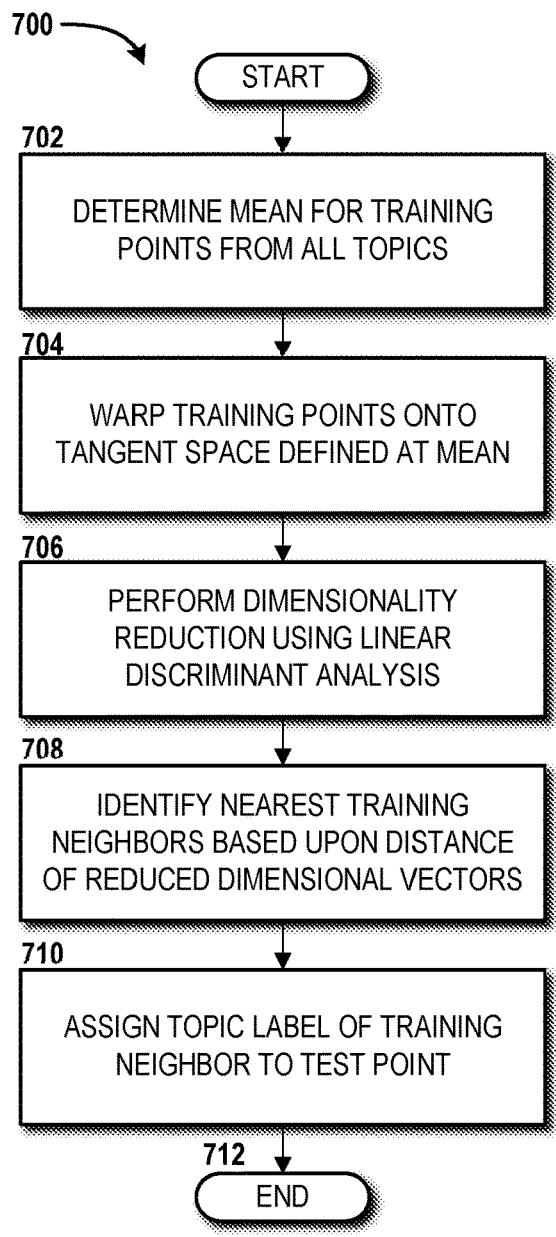
FIG. 7 is a flow diagram illustrating aspects of a method for predicting images based upon labeled training points and unlabeled test points, according to an illustrative embodiment of the concepts and technologies disclosed herein.

Turning now to FIG. 7, a flow diagram illustrating aspects of a method 700 for predicting images based upon labeled training points and an unlabeled test point will be described, according to an illustrative embodiment of the concepts and technologies disclosed herein. The method 700 begins and proceeds to operation 702, where the image prediction system 102 determines the mean for training points from all topics 110. In some embodiments, the image prediction system 102 can compute the mean as the Karcher mean.

From operation 702, the method 700 proceeds to operation 704, where the image prediction system 102 warps the training points onto the tangent space T defined at the mean. From operation 704, the method 700 proceeds to operation 706, where the image prediction system 102 performs dimensionality reduction using linear discriminant analysis ("LDA"). From operation 706, the method 700 proceeds to operation 708, where the image prediction system 102 performs the same procedure as set forth above for an unlabeled test point and identifies the nearest training neighbor based upon the $\ell_2$ distance of the reduced dimensional vectors. From operation 708, the method 700 proceeds to operation 710, where the image prediction system 102 assigns the topic label 110 of the nearest training neighbor to the test point. From operation 710, the method 700 proceeds to operation 712. The method 700 ends at operation 712.

The methods 500, 600, 700 can be applied to multiple test images or a single test image. The scenario in which a single test image, in the time interval between $T_1$ 108A and $T_2$ 108B, instead of a set of images in $\bar{x}_i^a$ will now be described. An issue with this scenario is that the temporal evolution $\bar{g}_i$ cannot be captured from a single image in the pursuit of finding nearest training neighbors using statistics on the shape space S 112. The image prediction system 102 can adopt the strategy of first selecting parametric curves $g_i$'s that have images most similar to the test image. For each parametric curve $g_i$, the image prediction system 102 can assign the minimum of the $\ell_2$ distance computed between the feature vector of the test image with the feature vector of each image contained in $x_i$. The image prediction system 102 can then sort the parametric curves $g_i$'s in increasing order of the $\ell_2$ distance, select the top 50% of the parametric curves $g_i$'s, and then the image prediction system 102 can pursue statistics on the respective parametric curves $G_i$'s to perform prediction.

For the case in which the training and test data are labeled (e.g., the method 500), the image prediction system 102 can shortlist the top 50% of parametric curves $g_i$'s corresponding to the test data topic, compute the mean of the corresponding $G_i$'s, and perform PCA on the tangent space T. The image prediction system 102 can then obtain the k nearest training neighbors whose PCA-based reduced dimensional vectors are closest to the mean of all such reduced dimension vectors and use the corresponding parametric curves $g_i$'s to perform prediction as described above. For the case in which the training and test data are unlabeled (e.g., the method 600), the image prediction system 102 can perform operations similar to those describe above for the case in which the training and test data are labeled but for shortlisting the top 50% parametric curves $g_i$'s from all topics, since the training and test data are not labeled. For the case in which training data is labeled and test data is unlabeled, the image prediction system 102 can identify a test topic label by considering the top 50% of the parametric curves $g_i$'s from all topics, compute the mean of the corresponding $G_i$'s, and perform LDA on the tangent space T as described above for the case in which training data is labeled and test data is unlabeled. The image prediction system 102 can then identify the LDA-based reduced dimension vector that is closest to the mean of all such reduced dimension vectors, assign the corresponding topic label to the test image, and then follow steps described above for the case in which training and test data are labeled to perform prediction for the test image. To summarize, the image prediction system 102 can utilize image similarity as the cue to identify closest training points with which the image prediction system 102 can subsequently model the temporal evolution thereof to perform prediction for the test image.

Prediction scenarios might arise wherein the goal is to predict images pertaining to a topic in general, as opposed to being given a set of test images or a single test image in $\bar{x}_i^a$ and asked to make predictions based that image or set of images. Given training data $\{x_i\}_i$ with topic labels, the image prediction system 102 can identify the subset of training points that are best suited for prediction. The image prediction system 102 can implement this identification using a clustering approach, and the operations of the method 500 can be followed to project the training points corresponding to the test topic onto its tangent space T. Afterwards, the image prediction system 102 can perform k-means clustering on the tangent space T. The image prediction system 102 can then use the parametric curves $g_i$'s corresponding to the training points closest to each of the k cluster centers to perform prediction as described above.

It should be understood that the techniques utilized by the image prediction system 102 to perform the operations of the methods 500, 600, 700 and the additional prediction scenarios described herein above are merely illustrative examples of some of the statistical tools that can be utilized by the image prediction system 120. Those skilled in the art will appreciate the applicability of other statistical tools that can be implemented by the image prediction system 102 to achieve the same or similar results to those described herein. Accordingly, the use of statistical tools such as PCA, LDA and k-means should not be construed as being limiting in any way.

Figure 8:
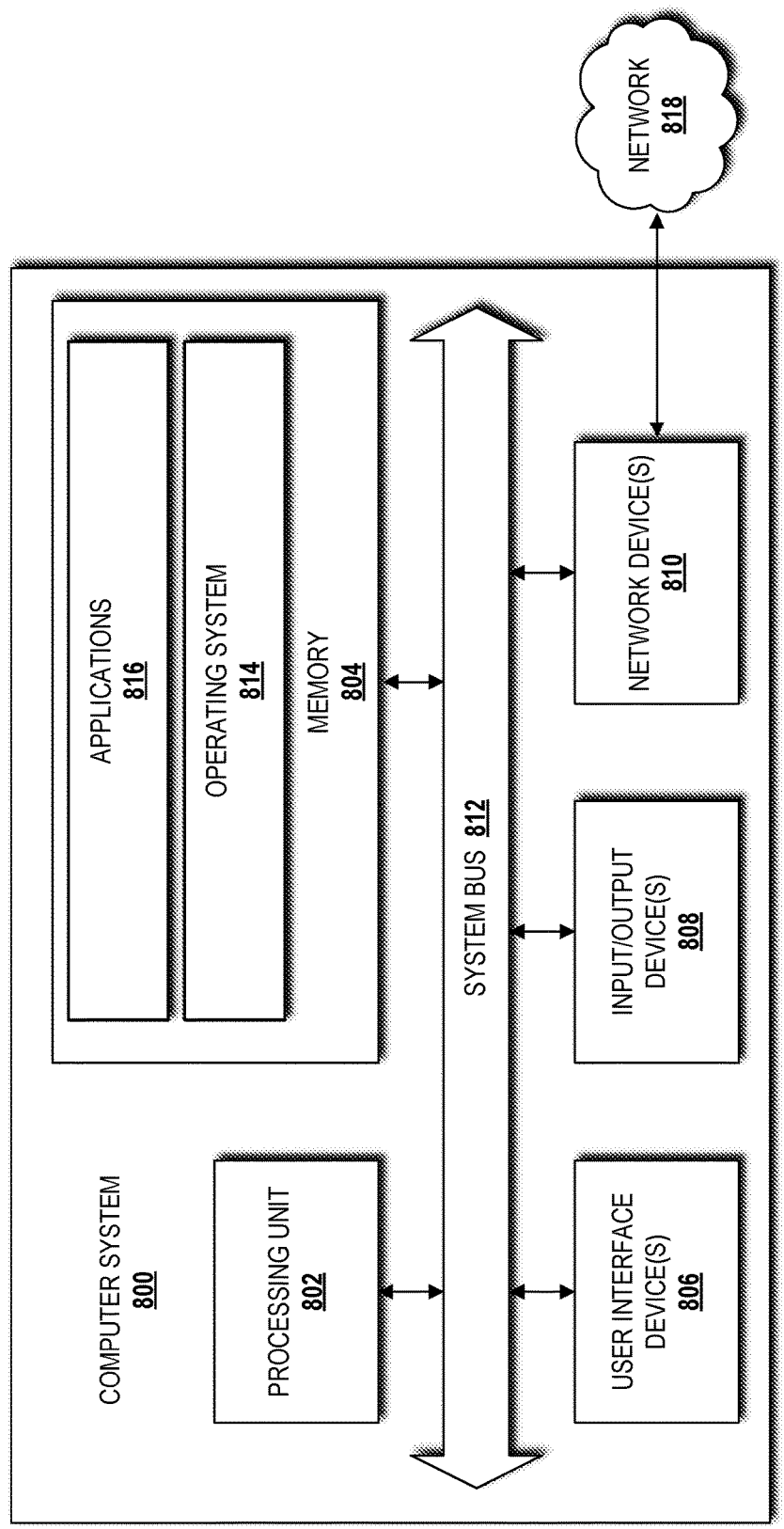
FIG. 8 is a block diagram illustrating an example computer system capable of implementing aspects of the embodiments presented herein.

FIG. 8 is a block diagram illustrating a computer system 800 configured to perform various operations disclosed herein. The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810. In some embodiments, the image prediction system 102 or one or more components thereof can be configured, at least in part, like the computer system 800. It should be understood, however, that one or more of these elements may include additional functionality or include less functionality than now described.

The processing unit 802 may be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The illustrated memory 804 includes an operating system and one or more applications 816.

The operating system 814 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 806 may include one or more devices with which a user accesses the computer system 800. The user interface devices 806 may include, but are not limited to, computers, servers, personal digital assistants, telephones (e.g., cellular, IP, or landline), or any suitable computing devices. The I/O devices 808 enable a user to interface with the program modules. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, a touchscreen, or an electronic stylus. Further, the I/O devices 808 may include one or more output devices, such as, but not limited to, a display screen or a printer.

The network devices 810 enable the computer system 800 to communicate with other networks or remote systems via a network 818. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a wireless local area network ("WLAN") such as a WI-FI network, a wireless wide area network ("WWAN"), a wireless personal area network ("WPAN") such as BLUETOOTH, or a wireless metropolitan area network ("WMAN"). Alternatively, the network 818 may be a wired network such as, but not limited to, a WAN such as the Internet, a LAN such as the Ethernet, a wired PAN, or a wired MAN.

Figure 9:
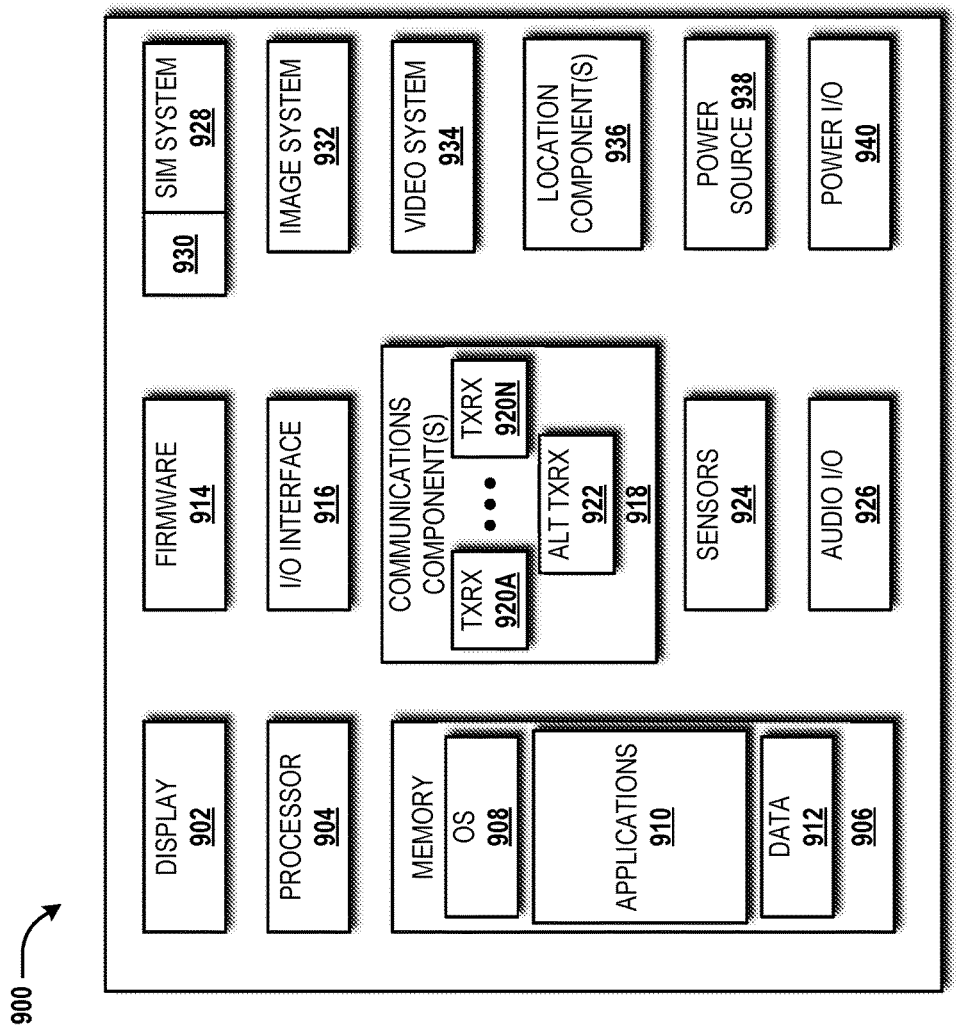
FIG. 9 is a block diagram illustrating an example mobile device capable of implementing aspects of the embodiments disclosed herein.

Turning now to FIG. 9, an illustrative mobile device 900 and components thereof will be described. In some embodiments, the image prediction system 102 is configured the same as or similar to the mobile device 900. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in the memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in data communications, entering/deleting data, entering and setting user IDs and passwords for device access, configuring settings, manipulating content and/or settings, multimode interaction, interacting with other applications 910, and otherwise facilitating user interaction with the operating system 908, the applications 910, and/or other types or instances of data 912 that can be stored at the mobile device 900.

The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks described herein. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments, one or more of the transceivers of the communications component 918 may be configured to communicate using Global System for Mobile communications ("GSM"), Code Division Multiple Access ("CDMA") CDMAONE, CDMA2000, Long-Term Evolution ("LTE"), and various other 2G, 2.5G, 3G, 4G, 5G, and greater generation technology standards. Moreover, the communications component 918 may facilitate communications over various channel access methods (which may or may not be used by the aforementioned standards) including, but not limited to, time-division multiple access ("TDMA"), frequency-division multiple access ("FDMA"), wideband CDMA ("W-CDMA"), orthogonal frequency-division multiplexing ("OFDM"), space-division multiple access ("SDMA"), and the like.

In addition, the communications component 918 may facilitate data communications using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), evolved HSPA ("HSPA+"), and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 900 or other devices or computers described herein, such as the computer system 800 described above with reference to FIG. 8. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 900 in order to store and execute the software components presented herein. It is also contemplated that the mobile device 900 may not include all of the components shown in FIG. 9, may include other components that are not explicitly shown in FIG. 9, or may utilize an architecture completely different than that shown in FIG. 9.

Based on the foregoing, it should be appreciated that concepts and technologies for image prediction have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

I claim:

1. A method comprising:
receiving, by an image prediction system comprising a processor, a training data set comprising a plurality of training images;
defining, by the image prediction system, N-dimensional feature vectors corresponding to the plurality of training images in the training data set;
parameterizing, by the image prediction system, the N-dimensional feature vectors to obtain a plurality of parameterized curves corresponding to the plurality of training images in the training data set;
obtaining, by the image prediction system, a square root velocity representation for each parameterized curve of the plurality of parameterized curves;
rescaling, by the image prediction system, the plurality of parameterized curves to remove scaling variability among the plurality of parameterized curves
defining, by the image prediction system, a pre-shape space for the plurality of parameterized curves; and
obtaining, by the image prediction system, shape space points pertaining to each parameterized curve of the plurality of parameterized curves on a shape space that inherits a structure from the pre-shape space.

2. The method of claim 1, further comprising:
collecting, by the image prediction system, a set of test images within a time range;
parameterizing, by the image prediction system, the set of test images to obtain a test parameterized curve; and
obtaining, by the image prediction system, a new square root velocity representation point for the test parameterized curve on the shape space.

3. The method of claim 1, further comprising:
determining, by the image prediction system, a mean of a plurality of training points on the shape space, wherein each of the plurality of training points corresponds to the square root velocity representation for each corresponding parameterized curve of the plurality of parameterized curves;
defining, by the image prediction system, a tangent space around the mean;
warping, by the image prediction system, the plurality of training points from the shape space onto the tangent space using inverse exponential mapping;
performing, by the image prediction system, multi-variate statistical analysis on the tangent space to determine a most representative subset of the plurality of training points for a given test point; and
predicting, by the image prediction system, a test image.

4. The method of claim 1, further comprising:
selecting, by the image prediction system, a topic for prediction;
considering, by the image prediction system, a plurality of training points pertaining to the topic for prediction;
determining, by the image prediction system, a mean of the plurality of training points on the shape space, wherein each of the plurality of training points corresponds to the square root velocity representation for each corresponding parameterized curve of the plurality of parameterized curves belonging to the topic selected for prediction;
warping, by the image prediction system, the plurality of training points from the shape space onto a tangent space defined at the mean;
performing, by the image prediction system, a principal component analysis on the tangent space to yield a principal component analysis matrix;
performing, by the image prediction system, dimensionality reduction by retaining eigenvectors with eigenvalues greater than 0.1;
warping, by the image prediction system, a test point onto the tangent space corresponding to the topic for selected for prediction;
performing, by the image prediction system, dimensionality reduction using the principal component analysis matrix learnt on the tangent space;
considering, by the image prediction system, a nearest training neighbor based upon a distance of the eigenvectors; and
predicting, by the image prediction system, a test image based upon a test parameterized curve corresponding to the nearest training neighbor.

5. The method of claim 1, further comprising:
determining, by the image prediction system, a mean of the plurality of training points on the shape space, wherein each of the plurality of training points corresponds to the square root velocity representation for each corresponding parameterized curve of the plurality of parameterized curves;

warping, by the image prediction system, the plurality of training points from the shape space onto a tangent space defined at the mean;

performing, by the image prediction system, a principal component analysis on the tangent space;

warping, by the image prediction system, a test point onto the tangent space;

considering, by the image prediction system, a nearest training neighbor based upon a distance of the eigenvectors; and predicting, by the image prediction system, a test image based upon a test parameterized curve corresponding to the nearest training neighbor.

6. The method of claim 1, further comprising:

determining, by the image prediction system, a mean of the plurality of training points on the shape space;

warping, by the image prediction system, the plurality of training points from the shape space onto a tangent space defined at the mean;

performing, by the image prediction system, dimensionality reduction using linear discriminant analysis to obtain reduced dimensional vectors;

considering, by the image prediction system, a nearest training neighbor based upon a distance of the reduced dimensional vectors; and assigning, by the image prediction system, a topic label of the nearest training neighbor to a test point.

7. The method of claim 1, further comprising:

collecting, by the image prediction system, a test image within a time range;

parameterizing, by the image prediction system, the test image to obtain a test parameterized curve; and obtaining, by the image prediction system, a new square root velocity representation point for the test parameterized curve on the shape space.

8. A computer-readable storage medium comprising computer-executable instructions that, when executed by a processor, causes the processor to perform operations comprising:

receiving a training data set comprising a plurality of training images;

defining N-dimensional feature vectors corresponding to the plurality of training images in the training data set;

parameterizing the N-dimensional feature vectors to obtain a plurality of parameterized curves corresponding to the plurality of training images in the training data set;

obtaining a square root velocity representation for each parameterized curve of the plurality of parameterized curves;

rescaling the plurality of parameterized curves to remove scaling variability among the plurality of parameterized curves;

defining a pre-shape space for the plurality of parameterized curves; and obtaining shape space points pertaining to each parameterized curve of the plurality of parameterized curves on a shape space that inherits a structure from the pre-shape space.

9. The computer-readable storage medium of claim 8, wherein the operations further comprise:

collecting a set of test images within a time range;

parameterizing the set of test images to obtain a test parameterized curve; and obtaining a new square root velocity representation point for the test parameterized curve on the shape space.

10. The computer-readable storage medium of claim 8, wherein the operations further comprise:

determining a mean of a plurality of training points on the shape space, wherein each of the plurality of training points corresponds to the square root velocity representation for each corresponding parameterized curve of the plurality of parameterized curves;

defining a tangent space around the mean;

warping the plurality of training points from the shape space onto the tangent space using inverse exponential mapping;

performing multi-variate statistical analysis on the tangent space to determine a most representative subset of the plurality of training points for a given test point; and predicting a test image.

11. The computer-readable storage medium of claim 8, wherein the operations further comprise:

selecting a topic for prediction;

considering a plurality of training points pertaining to the topic for prediction;

determining a mean of the plurality of training points on the shape space, wherein each of the plurality of training points corresponds to the square root velocity representation for each corresponding parameterized curve of the plurality of parameterized curves belonging to the topic selected for prediction;

warping the plurality of training points from the shape space onto a tangent space defined at the mean;

performing a principal component analysis on the tangent space to yield a principal component analysis matrix;

performing dimensionality reduction by retaining eigenvectors with eigenvalues greater than 0.1;

warping a test point onto the tangent space corresponding to the topic for selected for prediction;

performing dimensionality reduction using the principal component analysis matrix learnt on the tangent space;

considering a nearest training neighbor based upon a distance of the eigenvectors; and predicting a test image based upon a test parameterized curve corresponding to the nearest training neighbor.

12. The computer-readable storage medium of claim 8, wherein the operations further comprise:

determining a mean of the plurality of training points on the shape space, wherein each of the plurality of training points corresponds to the square root velocity representation for each corresponding parameterized curve of the plurality of parameterized curves;

warping the plurality of training points from the shape space onto a tangent space defined at the mean;

performing a principal component analysis on the tangent space;

warping a test point onto the tangent space;

considering a nearest training neighbor; and predicting a test image based upon a test parameterized curve corresponding to the nearest training neighbor.

13. The computer-readable storage medium of claim 8, wherein the operations further comprise:

determining a mean of the plurality of training points on the shape space;

warping the plurality of training points from the shape space onto a tangent space defined at the mean;

performing dimensionality reduction using linear discriminant analysis to obtain reduced dimensional vectors;

considering a nearest training neighbor based upon a distance of the reduced dimensional vectors; and assigning a topic label of the nearest training neighbor to a test point.

14. The computer-readable storage medium of claim 8, wherein the operations further comprise:
    collecting a test image within a time range;
    parameterizing the test image to obtain a test parameterized curve; and
    obtaining a new square root velocity representation point for the test parameterized curve on the shape space.

15. A system comprising:
    a processor; and
    memory that stores instructions that, when executed by the processor, cause the processor to perform operations comprising
        receiving a training data set comprising a plurality of training images,
        defining N-dimensional feature vectors corresponding to the plurality of training images in the training data set,
        parameterizing the N-dimensional feature vectors to obtain a plurality of parameterized curves corresponding to the plurality of training images in the training data set,
        obtaining a square root velocity representation for each parameterized curve of the plurality of parameterized curves,
        rescaling the plurality of parameterized curves to remove scaling variability among the plurality of parameterized curves,
        defining a pre-shape space for the plurality of parameterized curves, and
        obtaining shape space points pertaining to each parameterized curve of the plurality of parameterized curves on a shape space that inherits a structure from the pre-shape space.

16. The system of claim 15, wherein the operations further comprise:
    collecting a set of test images within a time range;
    parameterizing the set of test images to obtain a test parameterized curve; and
    obtaining a new square root velocity representation point for the test parameterized curve on the shape space.

17. The system of claim 15, wherein the operations further comprise:
    determining a mean of a plurality of training points on the shape space, wherein each of the plurality of training points corresponds to the square root velocity representation for each corresponding parameterized curve of the plurality of parameterized curves;
    defining a tangent space around the mean;
    warping the plurality of training points from the shape space onto the tangent space using inverse exponential mapping;
    performing multi-variate statistical analysis on the tangent space to determine a most representative subset of the plurality of training points for a given test point; and
    predicting a test image.

18. The system of claim 15, wherein the operations further comprise:
    selecting a topic for prediction;
    considering a plurality of training points pertaining to the topic for prediction;
    determining a mean of the plurality of training points on the shape space, wherein each of the plurality of training points corresponds to the square root velocity representation for each corresponding parameterized curve of the plurality of parameterized curves belonging to the topic selected for prediction;
    warping the plurality of training points from the shape space onto a tangent space defined at the mean;
    performing a principal component analysis on the tangent space to yield a principal component analysis matrix;
    performing dimensionality reduction by retaining eigenvectors with eigenvalues greater than 0.1;
    warping a test point onto the tangent space corresponding to the topic for selected for prediction;
    performing dimensionality reduction using the principal component analysis matrix learnt on the tangent space;
    considering a nearest training neighbor based upon a distance of the eigenvectors; and
    predicting a test image based upon a test parameterized curve corresponding to the nearest training neighbor.

19. The system of claim 15, wherein the operations further comprise:
    determining a mean of the plurality of training points on the shape space, wherein each of the plurality of training points corresponds to the square root velocity representation for each corresponding parameterized curve of the plurality of parameterized curves;
    warping the plurality of training points from the shape space onto a tangent space defined at the mean;
    performing a principal component analysis on the tangent space;
    warping a test point onto the tangent space;
    considering a nearest training neighbor based upon a distance of the eigenvectors; and
    predicting a test image based upon a test parameterized curve corresponding to the nearest training neighbor.

20. The system of claim 15, wherein the operations further comprise:
    determining a mean of the plurality of training points on the shape space;
    warping the plurality of training points from the shape space onto a tangent space defined at the mean;
    performing dimensionality reduction using linear discriminant analysis to obtain reduced dimensional vectors;
    considering a nearest training neighbor based upon a distance of the reduced dimensional vectors; and
    assigning a topic label of the nearest training neighbor to a test point.

* * * * *